US009197690B2

(12) United States Patent
Oz et al.

(10) Patent No.: US 9,197,690 B2
(45) Date of Patent: Nov. 24, 2015

(54) METHOD AND SYSTEM FOR TRANSMITTING CONTENT

(75) Inventors: Ran Oz, Modiin (IL); Adi Molkho, Tel-Mond (IL)

(73) Assignee: ARRIS Enterprises, Inc., Suwanee, GA (US)

( * ) Notice: Subject to any disclaimer, the term of this patent is extended or adjusted under 35 U.S.C. 154(b) by 1037 days.

(21) Appl. No.: 12/565,792

(22) Filed: Sep. 24, 2009

(65) Prior Publication Data

US 2010/0077060 A1    Mar. 25, 2010

Related U.S. Application Data

(60) Provisional application No. 61/099,940, filed on Sep. 25, 2008.

(51) Int. Cl.
| | |
|---|---|
| H04L 29/06 | (2006.01) |
| H04N 21/2225 | (2011.01) |
| H04N 21/472 | (2011.01) |
| H04N 21/658 | (2011.01) |
| H04N 21/6408 | (2011.01) |

(52) U.S. Cl.
CPC .......... *H04L 65/605* (2013.01); *H04N 21/2225* (2013.01); *H04N 21/47202* (2013.01); *H04N 21/6408* (2013.01); *H04N 21/6581* (2013.01); *H04L 65/4076* (2013.01); *H04L 65/4084* (2013.01); *H04L 69/14* (2013.01)

(58) Field of Classification Search
CPC .......... H04N 7/17318; H04N 21/2225; H04N 21/47202; H04L 65/605
See application file for complete search history.

(56) References Cited

U.S. PATENT DOCUMENTS

| | | | |
|---|---|---|---|
| 6,697,806 B1 * | 2/2004 | Cook | |
| 7,237,251 B1 * | 6/2007 | Oz et al. | 725/40 |
| 7,971,215 B1 * | 6/2011 | Strasman | 725/34 |
| 7,986,702 B1 * | 7/2011 | Reister | 370/401 |
| 8,046,479 B2 * | 10/2011 | Einarsson et al. | 709/230 |
| 8,239,921 B2 * | 8/2012 | Benschop et al. | 726/3 |
| 2004/0117845 A1 * | 6/2004 | Karaoguz et al. | 725/134 |
| 2008/0002021 A1 * | 1/2008 | Guo et al. | 348/21 |
| 2008/0059646 A1 * | 3/2008 | Ludvig et al. | 709/231 |
| 2008/0109853 A1 * | 5/2008 | Einarsson et al. | 725/62 |
| 2008/0155619 A1 * | 6/2008 | Constantinof | 725/100 |
| 2009/0055880 A1 * | 2/2009 | Batteram et al. | 725/100 |
| 2009/0106792 A1 * | 4/2009 | Kan et al. | 725/34 |
| 2010/0031288 A1 * | 2/2010 | Scott et al. | 725/38 |
| 2010/0223357 A1 * | 9/2010 | Einarsson et al. | 709/219 |
| 2010/0281105 A1 * | 11/2010 | Sebastian | 709/203 |
| 2011/0277004 A1 * | 11/2011 | Hwang et al. | 725/108 |

* cited by examiner

*Primary Examiner* — Joe Chacko
(74) *Attorney, Agent, or Firm* — Troy A. Van Aacken

(57) ABSTRACT

This disclosure provides systems and methods for transmitting content to users. In some implementations, a system can include a session manager operable to initiate a unicast session with an end user device over a dedicated channel and to transmit a unicast multimedia stream associated with the unicast session. The unicast multimedia stream can include service identifier that is recognizable to the end user. The system can also include an interface operable to receive a transmission command that includes the end-user recognizable service identifier, and to transmit the content associated with the multimedia stream to the end user device in response to the content transmission command.

23 Claims, 8 Drawing Sheets

500

METHOD AND SYSTEM FOR TRANSMITTING CONTENT

CROSS REFERENCE TO RELATED APPLICATIONS

This application claims the benefit of U.S. Provisional Patent Ser. No. 61/099,940, filed on Sep. 25, 2008, which is incorporated in its entirety herein by reference.

FIELD OF THE INVENTION

The invention relates to methods and systems for transmitting content.

BACKGROUND OF THE INVENTION

Cable TV networks are a widespread solution for transmission of multimedia content from a central location to a multitude of subscribers. However, there is a need for reliable and simple means of receiving and transmitting content (such as uploaded by users or content that exist on different parts of the web) to individual subscribers and receiving consent of the receiving subscribers to such transmission (e.g. of advertising content).

SUMMARY OF EMBODIMENTS OF THE INVENTION

A system for transmitting multimedia content, the system includes: (a) a session manager, configured to initiate a unicast session with an end-user device over a dedicated channel; and to transmit to the end-user device over the dedicated channel an identification unicast multimedia stream that causes an end user multimedia device to provide an end user recognizable service identifier; and (b) an interface configured to receive a content transmission command which includes the service identifier; wherein the system is further configured to transmit a content multimedia stream that includes multimedia content to the end-user device in response to the content transmission command.

A method for transmitting multimedia content, the method includes: (a) initiating a unicast session with an end-user device over a dedicated channel; (b) transmitting to the end-user device over the dedicated channel an identification unicast multimedia stream that causes an end user multimedia device to provide an end user recognizable service identifier; (c) receiving a content transmission command that includes the service identifier; and (d) transmitting, in response to the content transmission command, a content multimedia stream that includes the multimedia content to the end-user device.

A server, the server includes: (a) at least one storage unit for storing multimedia content; (b) a processor, configured to generate a service identifier in response to a service identifier request; and to transmit the service identifier to an external network unit; (c) an input interface for receiving content transmission command that includes the service identifier; and (d) an output interface for selectively transmitting the multimedia content, wherein the transmitting is responsive to the reception of the content transmission command.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

Figure 1:
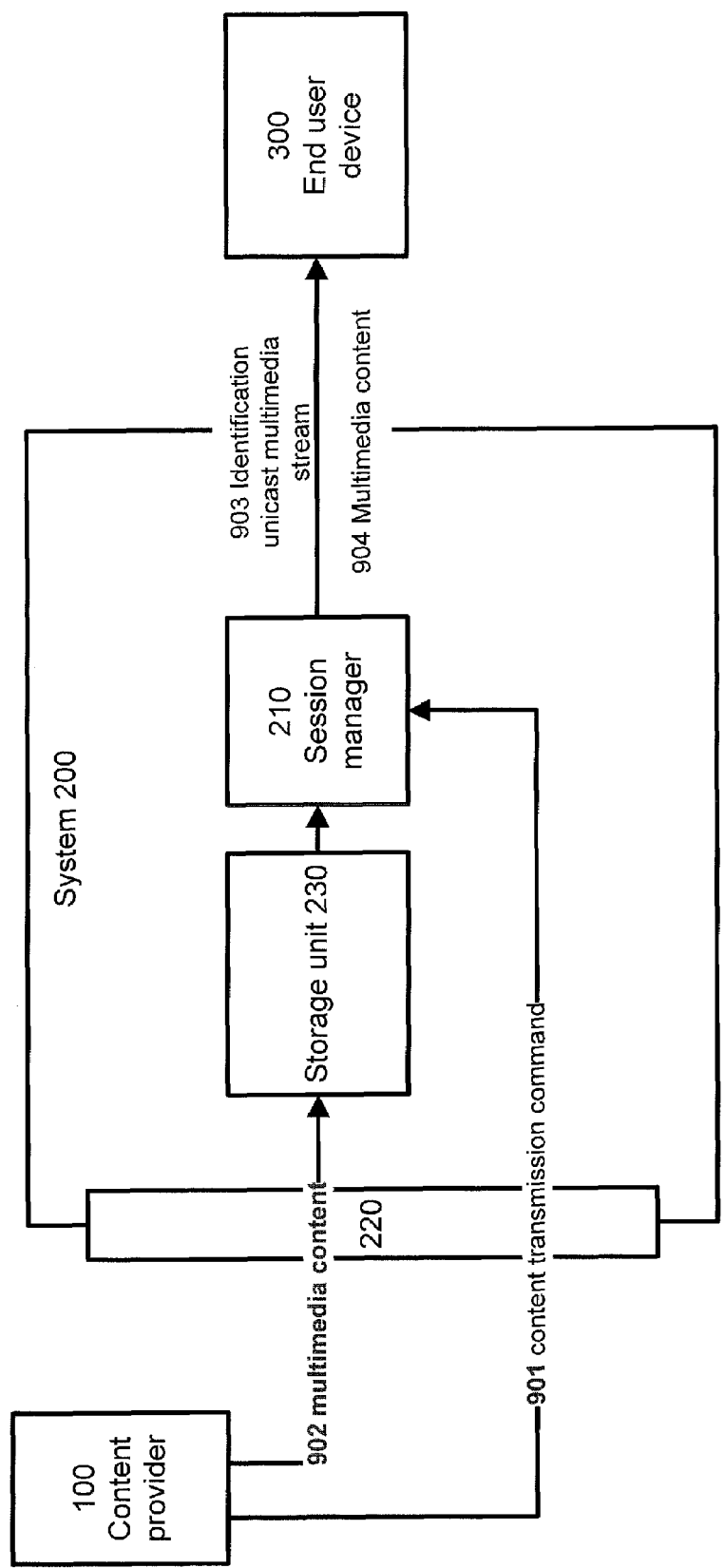
FIGS. 1, 2, and 3 illustrate systems for transmitting content, according to different embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

FIG. 1 illustrates system 200 for transmitting content, according to an embodiment of the invention.

It is noted that system 200 is, according to an embodiment of the invention, part of a cable television network. Thus, according to an embodiment of the invention, system 200 includes at least one interface (such as interface 220) for connected system 200 to a cable television network.

System 200 includes at least one session manager 210, configured to initiate and to manage a unicast session with an end-user device 300 over a dedicated channel. It is noted that the initiating of the unicast session is usually triggered by end user device 300, when end user device 300 (usually upon request from an end user), request to switch to a dedicated channel, hereinafter also referred to as "My channel". The dedicated channel may be used, as discussed below, for transmission of multimedia streams that are addressed to end-user device 300.

It is noted that, according to various embodiments of the invention, a single end user device 300 may support more that a single dedicated channel. For example, different end users in a house hold may use different dedicated channels, a single user may use more than one channel (e.g. business and private, or for receiving data from several providers, and so forth). It will be clear to a person who is skilled in the art that the herein disclosed systems and methods may be extended to utilization of multiple dedicated channels using a single end user device, mutatis mutandis.

Usually session manager 210 is adapted to initiate and to manage unicast sessions with many end-user devices 300 to which it is connected by transmission network (e.g. cable TV infrastructure, as known in the art, while it is noted that the invention can be applied to many types of networks). Additionally, session manager may further be adapted to handle other types of transmission such as multicast, and broadcast. Additionally, it is further noted that session manager 210 and end user device 300 may be connected to one another by one or more intermediate components (not shown) such as hubs and so forth.

Session manager 210 is further configured to transmit to end-user device 300 over the dedicated channel an identification unicast multimedia stream (denoted 903) that causes an end user multimedia device to provide an end user recognizable service identifier (e.g. the identification unicast multimedia stream may be a video stream that include a visual representation of the service identifier). It is noted that the end-user multimedia device may be the end-user device 300 or a component thereof, or another device (e.g. a TV) that is connected thereto. It is noted that the end user recognizable service identifier is usually a representation of the service identifier that is recognizable by a human end-user, and possible in such a way that facilitate translating by the human end user to another medium (e.g. reading aloud a word).

The transmission of the identification unicast multimedia stream to end-user device may be carried out in different times, according to various embodiments of the invention. For example, according to an embodiment of the invention, the identification unicast multimedia stream may be transmitted only during a registration phase, which associates the end user device as a recipient. According to another embodiment of the invention, an identification unicast multimedia stream may be transmitted in the beginning of any session (e.g. any time the end user enters the service), wherein the end user recognizable service identifier may be the same each time, or may different. Other variations may also be implemented—for example, the user may request to receive an identification unicast multimedia stream with a new end user recognizable service identifier, e.g. if a previous one is being exploited by a content provider.

The service identifier may be, for example, a numerical or alphanumerical code, that is displayed on the end user multimedia device (e.g. a TV that is connected to end-user device 300, in case the latter is for example a set-top box, STB). It is noted that other service identifier may be used, which may be either recognizable by end-user device 300, by the end-user himself, by an additional unit connected to end-user device 300, or any combination thereof, depending on the implementation of the invention.

The identification unicast multimedia stream may, according to an embodiment of the invention, include a multimedia representation of the service identifier, such as a video representation thereof, a static visual representation thereof, an audio representation thereof, any combination thereof, and so on and so forth.

It is noted that, according to an embodiment of the invention, session manager 210 may be configured to transmit the service identifier over the dedicated channel not as a part of a multimedia stream, but this is not necessarily so. If the service identifier is transmitted as part of a multimedia stream (and possibly also if not), the transmission of the identification unicast multimedia stream may be preceded by generating the identification unicast multimedia stream that includes the service identifier. The identification unicast multimedia stream may be generated by session manager 210 or by another unit (which may be either upstream or downstream from session manager 210). Additionally, the service identifier itself may be generated by session manager 210 or by another unit (which may be either upstream or downstream from session manager 210). According to an embodiment of the invention, session manager 210 (or other component of system 200) is further configured to generate the service identifier. According to an embodiment of the invention, session manager 210 (or other component of system 200) is further configured to generate the identification unicast multimedia stream.

It is noted that, according to an embodiment of the invention, system 200 (or any component thereof) is configured to generate the identification unicast multimedia stream that includes the service identifier, wherein the generating includes implementing at least one mechanism of rendering the service identifier so as to obstruct a computerized deciphering of the service identifier (e.g. by way of a captcha), so as to make sure that a person was involved in future authorization process that requires the service identifier, as disclosed below.

Once end-user device 300 (or the end user, or the aforementioned additional unit) receives the service identifier, the same may be used for authorizing a transmission of content (and especially of multimedia content, denoted 904) to end user device 300. Usually that would require the end user (or end-user device 300, either instructed by the end-user or not) to provide the service identifier that was transmitted to a third party, which will instruct system 200 to transmit multimedia content to end-user device 300.

The providing of the service identifier to the third party that is a content provider may be carried out in different ways according to different embodiments of the invention. The service identifier may be provided over the same network that supports the dedicated channel (e.g. a channel TV network), but may also be provided over other type of communication (e.g. a telephone call, etc.) According to an embodiment of the invention, system 200 is configured to participate in a transmission of the service identifier from end-user device 300 to a third party such as a content provider, but in other embodiment of the invention this is not so.

System 200 further includes interface 220 for receiving a content transmission command (denoted 901) which includes the service identifier. The content transmission command typically refers to a specific content that is accessible to system 200 (e.g. that is stored in storage unit 230, which may be, for example, a memory unit, a server, an array of servers, and so on, depending on the implementation of the invention).

It is noted that system 200 is further adapted, according to an embodiment of the invention, to receive multimedia content (denoted 902) from a content provider 100, wherein the content transmission command 901 refers to transmission of the multimedia content 902. The multimedia content may be transcoded by system 200 (or by a system connected thereto), in order to prepare the multimedia content for transmission to end-user device 300.

As will be discussed below, the content transmission command may be received from the content provider 100 which provided the multimedia content, but this is not necessarily so.

System 200, and especially session manager 210, is further configured to transmit a content multimedia stream which includes the multimedia content to the end-user device.

According to an embodiment of the invention, system 200 (and especially session manager 210) is configured to transmit a unicast content media stream that includes the multimedia content to the end-user device over the dedicated channel.

According to an embodiment of the invention, system 200 (and especially session manager 210) is configured to transmit a multicast content media stream to multiple devices, one of which is usually end-user device 300. According to such scenario, a single end-user device (and or a single end user or other system) may authorize to transmit the multimedia content to several devices (e.g. all the set-top boxes in a household).

System 200 may be utilized to enable subscribers to retrieve personalized content via a standard interface of an end-user device 300, such as a television set (or a set-top box connected thereto). It should be noted that other types of end user devices 300 may be implemented (such as a screen or a speaker), mutatis mutandis, and that wherever the term TV is used, such other devices may be implemented as well.

It is noted that the systems and methods disclosed conveniently do not require need for any dedicated user interface on end-user device. It is further noted that system 200 may be implemented using existing switched digital video (SDV) clients. One of the implementations of the invention may serve for a simple low cost way to add personalization to a switched broadcast solution as a short term solution that will let cable operators offer personal services over existing infrastructure. As aforementioned, the invention is useful and readily implementable for other uses in cable television as well as in other types of networks. It is noted that when implemented for TV broadcasting, conveniently, existing SDV client are sufficient for system 200, and there is no need to change client is an existing system. According to an embodiment of the invention, extensions are needed to SDV solution.

It is noted that conveniently, system 200 is further configured to transmit a unicast content media stream that includes the multimedia content to the end-user device over the dedicated channel (i.e. the content media stream is a unicast stream). According to an embodiment of the invention, system 200 is configured to transmit a multicast content media stream to multiple devices (i.e. the content media stream is a multicast steam, e.g. when the end-user agrees to a transmission of the multimedia content to all the STBs of a household).

Figure 2:
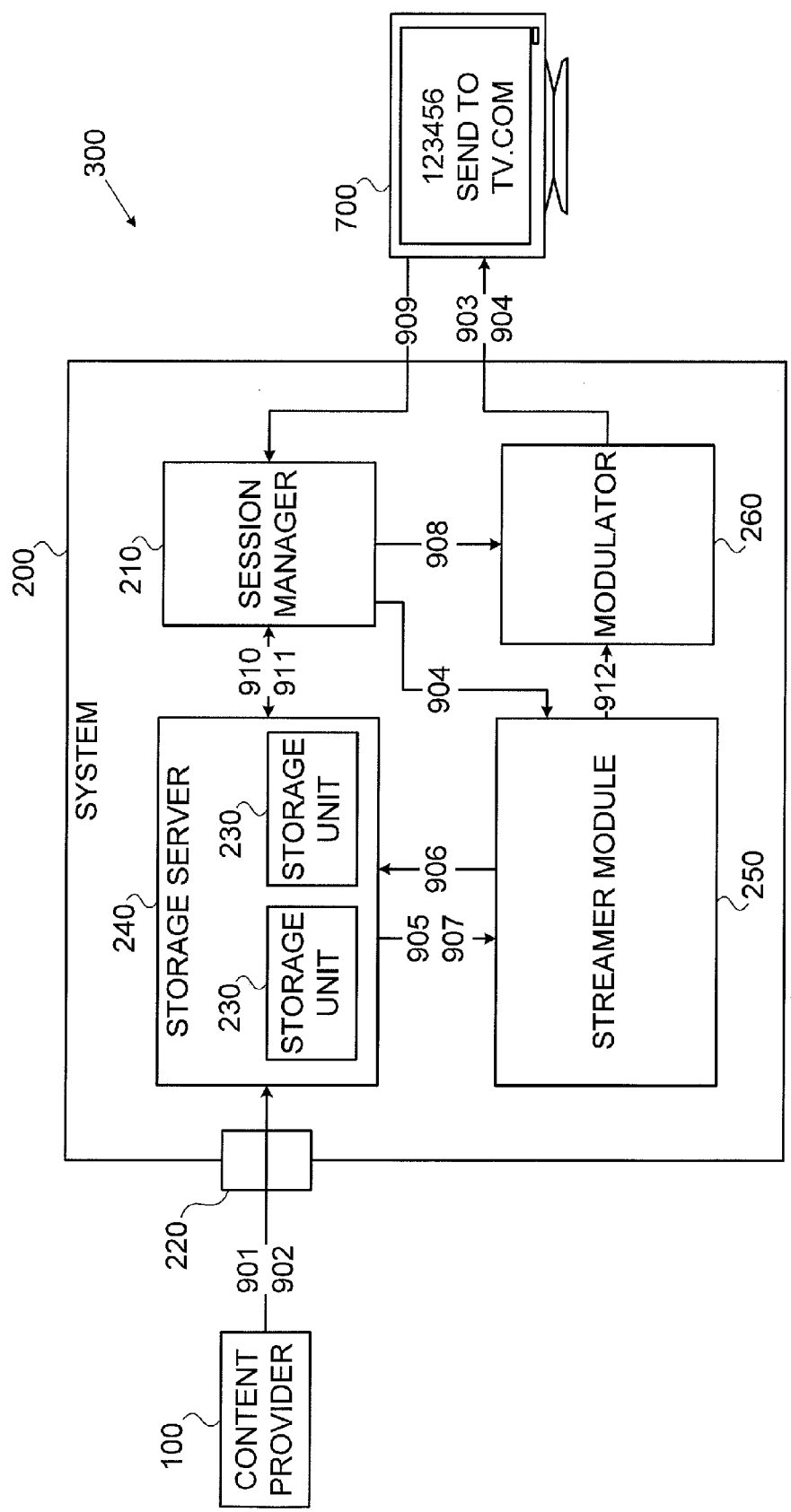

FIG. 2 illustrates system 200, according to an embodiment of the invention. According to an embodiment of the invention, session manager 210 is a Switched Broadcast Session Server (SBSS), such as the one produced by Bigband Networks Inc. of Fremont, Calif., or another switched broadcast server.

According to an embodiment of the invention, system 200 further includes one or more storage servers 240 (which may include on or more storage units 230), which stores all the content which can be possibly sent to clients using system 200 at a given moment. Storage server 240 may be a national server, or otherwise located at a high level of the network hierarchy, and it is noted that more than one session manager 210 may be connected to each of the one or more storage servers 240.

According to an embodiment of the invention, storage server 240 is further configured to delete content uploaded by content providers 100 from storage, according to different decision rules. The decisions rules may be responsive to different parameters, such as storage costs of the content, content provider's definitions, cost covered by the content provider, and so forth. According to an embodiment of the invention, storage server 240 is configured to transcode content that is uploaded to it into a multimedia stream that is supported by system 200 and/or by the network.

According to an embodiment of the invention, the storage server (whether internal or external) may be the point of contact of the content provider with system 200, and every communication (both uploading content and instructing transmission of the content to an end-user device 300) with system 200 is carried out via the storage server. However, this is not necessarily so.

It is noted that, according to an embodiment of the invention, storage server similar to storage server 240 is external to system 200. For example, according to an embodiment of the invention, the external storage server doesn't belong to any operator and can give services to all operators. According to an embodiment of the invention, every operator (or group of operators) may have its own storage server.

According to an embodiment of the invention, system 200 further includes streamer module 250, which is configured to download content from storage server 240 or from another unit of system 200 (wherein it is noted that wherever storage server 240 is referred to below, an external storage server may be implemented instead). Conveniently, streamer module 250 is further configured to transmit (or to participate in transmission of) multimedia content to end-user device 300. Furthermore, According to an embodiment of the invention, streamer module 250 is further configured to generate the identification unicast multimedia stream that includes the service identifier (denoted 700 in FIG. 2) when the latter is received from session manager 210 or from storage server 240 (depending on the embodiment of the invention. The request for the service identifier is denoted 910, and the providing of the service identifier to session manager 210 is denoted 211). According to such an embodiment of the invention, streamer module 250 may receive the service identifier and possibly additional parameters (e.g. opened session parameters) from session manager 210 (denoted 904).

It is noted that, according to an embodiment of the invention, streamer module 250 may be implemented by hardware, firmware, software, or any combination thereof.

According to an embodiment of the invention, streamer module 250 is configured to receive from storage server 240 or from another component of system 200 a content link (denoted 905), that points to a storage parameters (e.g. location) of the multimedia content to be transmitted at storage unit 230 or at storage server 240. The link is used by streamer module 250 for acquiring of the multimedia content from the storage (the request for the content is denoted 906, and the multimedia content transmitted to the streamer module is denoted 907).

According to an embodiment of the invention, system 200 further includes one or more modulators 260 (e.g. a quadrature amplitude modulation (QAM) modulator, an edge QAM modulator, such as broadband edge QAM (e.g. BEQ6000) of Bigband networks of Tel Aviv, Israel), for modulating multimedia stream for transmission over a network. For example, modulator 260 may modulate an internet protocol (IP) multimedia content stream that is received from storage server 240 into a radio frequency (RF) multimedia content stream that is suitable for transmission over cable TV network infrastructure. According to an embodiment of the invention, modulator 260 is configured to receive a session opening command (denoted 908) from session manager, and to initiate a session with end-user device 300. According to an embodiment of the invention, modulator 260 receives the multimedia stream (denoted 912) from streamer module 250.

According to an embodiment of the invention, session manager 210 is configured to initiate the unicast session with end-user device 300 is response to a reception of a unicast session request (denoted 909) from end-user device 300. For example, the end-user (or end-user device 300), when offered by a content provider 100 to receive a multimedia content, may accept the offer, and in order to receive the multimedia content would elect to switch to a dedicated channel by selecting a channel (e.g. using a remote control), such as by selecting a channel named "my channel" dedicated for unicast transmission of multimedia content. When switching to such channel, a unicast session request may be transmitted to system 200, which will respond with the identification unicast multimedia stream. The offer by the content provider 100 may be received over the network (e.g. in an addressed advertisement below a TV program), or in other channels (e.g. a telephone conversation). While the identification unicast multimedia stream transmitted or other communication with end-user device 300 may depend on whether the offering was made over the network or not (e.g. using previous parameters), this is not necessarily so.

Figure 3:
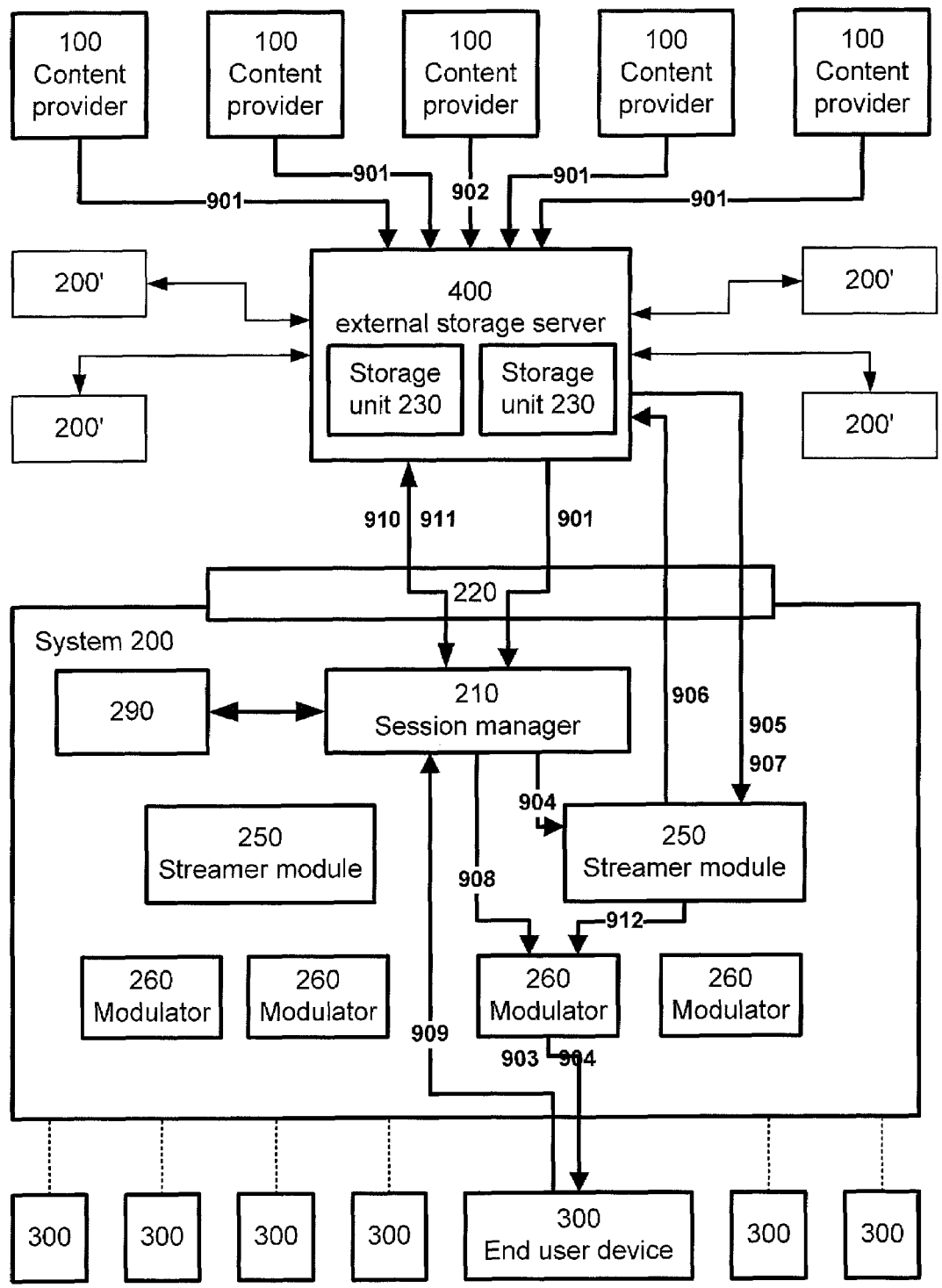

FIG. 3 illustrates system 200, according to an embodiment of the invention. According to an embodiment of the invention, the storage server is an external storage server 400, which may be located in a remote location, and serve multiple systems 200 (e.g. of a different service operators such as different cable TV providers, such additional systems 200 are denoted as 200' and are illustrated in a different scale).

Additionally, each system 200 may include multiple streamer modules 250, multiple modulators 260, and even multiple session managers 210 (not illustrated) and multiple interfaces 220 (not illustrated). Additionally, system 200 may receive the content transmission command 901 directly from a content provider 100, and through the external storage server (e.g. in a scenario in which the content transmission command 901 is received through the network infrastructure. For example, and end-user device 300 may also serve as a content provider for another end-user device 300).

Referring now to the multimedia content transmitted to end-user device 300 according to the content transmission command 901, which is conveniently a multimedia content 902 uploaded by a content provider 100 (even though not necessarily the one that issues the content transmission command 901, e.g. as illustrated in FIG. 3). The multimedia content transmitted to end-user device 300 may be of different kinds, depending on different implementations of the invention. For example, the multimedia content may be personalized content and different types thereof, such as (though not limited to): Commercial content in the interests of the subscriber (end-user of end-user device 300), Personal photos, or videos sent between friends/families, and so forth.

According to an embodiment of the invention, system 200 offers cross operator service, wherein any content provider 100 with internet connection can send content to any SDV subscriber nation-wide. This is conveniently implemented using an external storage server 400 that serves systems 200 of different operators. Conveniently, there is no need for a multi-vendor echo system. Additionally, it is noted that conveniently, the offered methods and systems may be implemented with SD and HD.

According to an embodiment of the invention, system 200 further include charging module 290, which is configured to determine a cost for charging from an entity associated with end-user device 300 (e.g. subscriber), and/or from an entity associated with content provider 100 (e.g. an advertiser, or another user).

Figure 4:
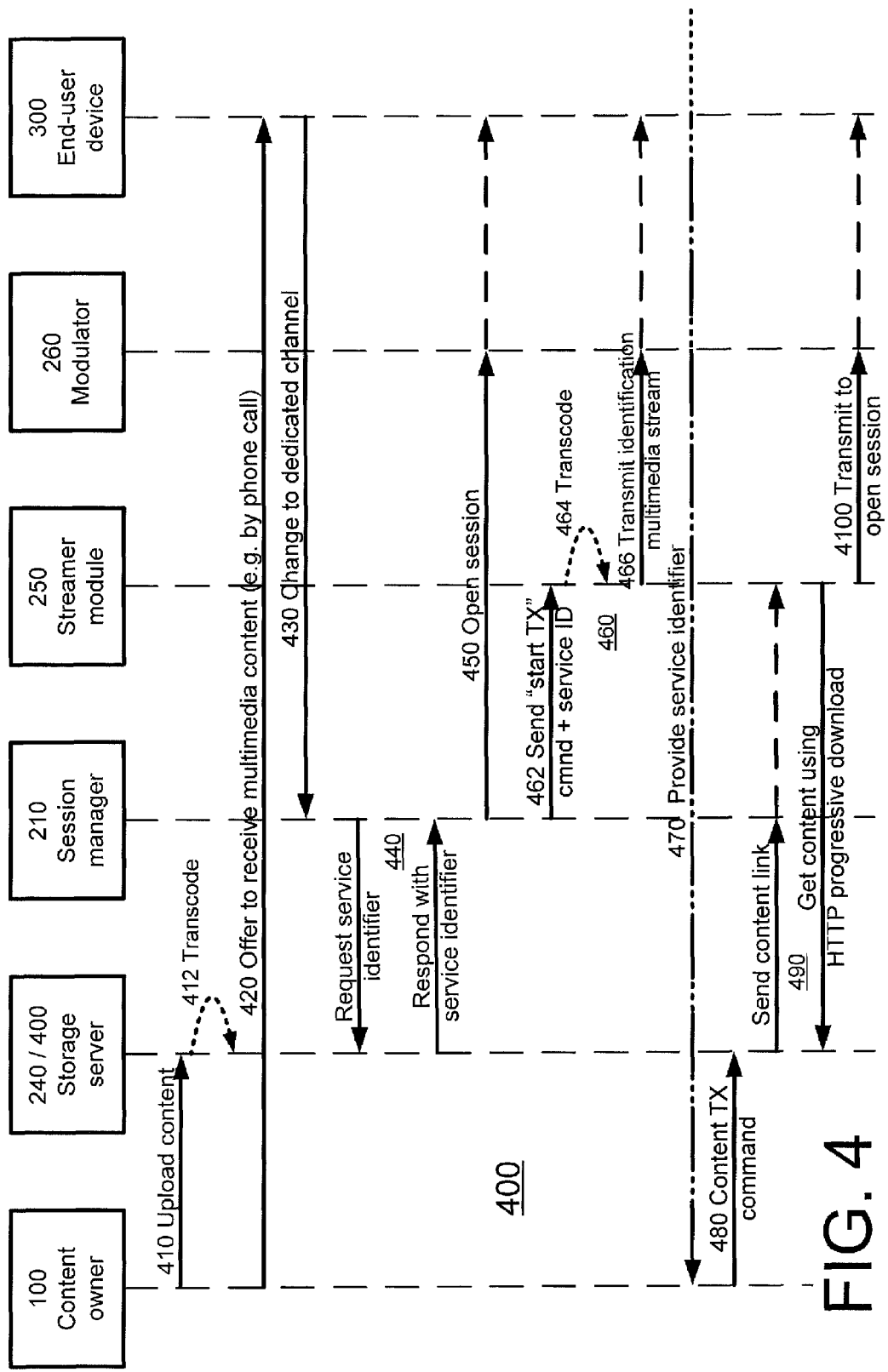
FIG. 4 is a sequence diagram of a process for transmitting multimedia content, according to an embodiment of the invention.

FIG. 4 is a sequence diagram of process 400 for transmitting multimedia content, according to an embodiment of the invention. Referring to the examples set forth in the previous drawings, according to an embodiment of the invention, the different components may be components of system 200, or of other systems discussed above.

Conveniently, process 400 starts with step 410 of uploading content by a content owner to a storage server or to other storage unit that is accessible to a multimedia content transmission system. It is noted that process 400 (as well as system 200 and method 500 discussed below) may also be implemented for real-time transmitted content for a content provider, mutatis mutandis.

The storage server or unit stores the uploaded content for a period of time that is usually sufficient for the transmission of the multimedia content to at least one end-user device, and possibly much more (e.g. days, weeks, months). The multimedia content is usually transcoded to a format that is suitable for multimedia content storage and/or storage (the latter case may require additional transcoding at a latter time), either by the storage server/unit (the transcoding denoted 412), or by another system or other component of system 200.

Once the multimedia content is uploaded, the content provider (or other content provider authorized to do so) may than offer (denoted 420) subscribers and end-users of the network and/or of system 200 to receive the multimedia content. The act of offering may be either as part of network transmission (e.g. a menu in a cable-TV menu, such as a TV mosaic guide, or a pop-up during a transmission of another program), or out of the network (e.g. by a phone call).

If the end-user/subscriber wants to accept the offer, he can switch to the dedicated channel (denoted 430), e.g. by selecting to switch using a remote control button or a GUI button. The request to switch to the dedicated channel may be transmitted by the end-user device of the end-user to different components of a multimedia content transmission system, depending on the implementation of the invention, such as the session manager thereof.

The session manager will initiate a unicast session with the end-user device over the dedicated channel (denoted 450) and will transmit to the end-user device over the dedicated channel an identification unicast multimedia stream that causes the end user multimedia device to provide the end user recognizable service identifier (denoted 460). According to an embodiment of the invention, the initiating of the unicast session includes allocating a modulator for the unicast session, and/or allocating additional intermediary components.

The session manager may either generate the service identifier itself, or alternatively receive the service identifier from an external component such as the storage server (denoted 440). It is noted that the transmission of the identification unicast multimedia stream may be facilitated by a streamer module that receives a command from the session manager (denote 462), possibly transcodes or generates the identification unicast multimedia stream (denoted 464), and transmits the identification unicast multimedia stream (denoted 466).

Once the end-user/subscriber (or alternatively the end-user device if authorized to), received the identification unicast multimedia stream, it provides it to the content provider (denoted 470), which can not transmit the multimedia content to the end-user device without the service identifier which acts as an authorization code. The providing of the session identifier to the content provider (or to another authorized content provider) may be carried out or over the transmission network, or otherwise. It is noted that different content providers may participate in process 400. For example, considering an advertising content, an advertising center may upload content to the storage server, a sales representative may offer a client during a phone conversation to view the multimedia content, and the client may approve it's end-user device to transmit the service identifier over the transmission network to a second advertising center which send transmission commands that includes the service identifiers received from clients.

Having received the service identifier, the content provider transmits to a content transmission command which includes the service identifier to the storage server (denoted 480) or to another component such as the session manager (not illustrated), which is followed by a transmission of the multimedia content over the open session (denoted 4100). Other intermediately processes between components of the multimedia content system and/or the storage server unit may take place (those collectively denoted 490).

It is noted that, according to an embodiment of the invention, the acquiring of the multimedia content from the storage server/unit may be carried out using HTTP progressive download. It is however noted that other techniques of multimedia content acquiring may be implemented.

Referring to charging models, it is noted that different charging models may be implemented, among which are the different charging models which are known in the art, e.g. for providing of content, or from equivalent fields. According to an embodiment of the invention, the charging models may be similar to those implemented in SMS/MMS model (per transaction), charging the sender only. According to an embodiment of the invention, can be subscription fee—charging the subscriber.

Figure 5:
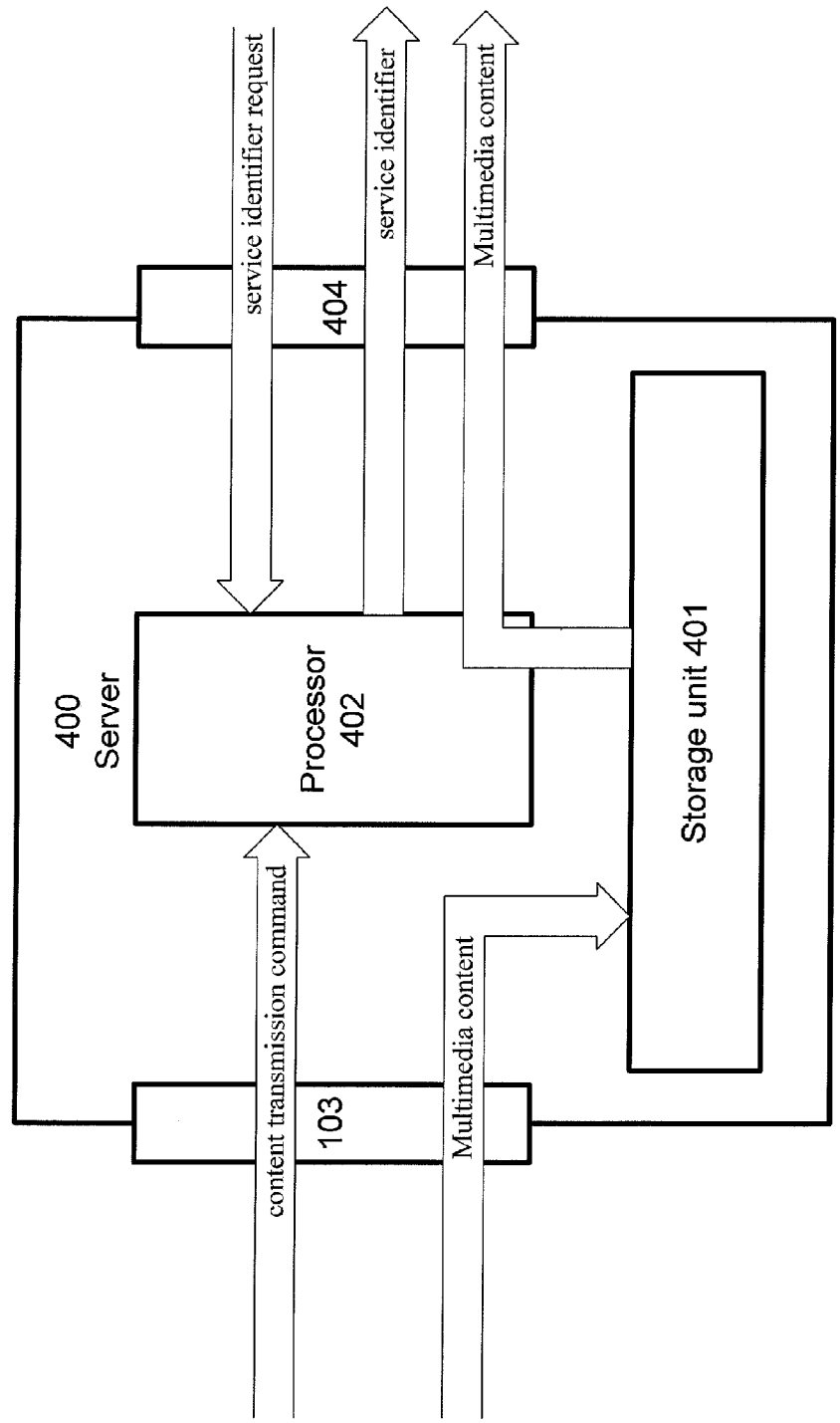
FIG. 5 illustrates a server, according to an embodiment of the invention.

FIG. 5 illustrates server 400, according to an embodiment of the invention. server 400 (also referred to an external server) includes at least one storage unit 401 for storing multimedia content; processor 402, configured to generate a service identifier in response to a service identifier request (which is usually received from a network unit such as session manager 210); and to transmit the service identifier to an external network unit (such as session manager 210); input interface 402 for receiving content transmission command which includes the service identifier (it is noted that the external server may receive the command either from a content provider 100, or from a network unit such as session manager 210, depending on the implementation); and output interface 404 for selectively transmitting the multimedia content, wherein the transmitting is responsive to the reception of the content transmission command.

The multimedia content is usually received from a content provider (e.g. through interface 403, or through another interface), but it is noted that, according to an embodiment of the invention, server 400 may generate at least some of the multimedia content.

It is noted that each of interfaces 403 and 404 may be bi-directional. For example, output interface 404 may further be used for receiving the service identifier request, e.g. if the latter is received from a down-stream network component. It is further noted that output interface 404 may output the multimedia content either as a multimedia stream (e.g. MPEG stream) or otherwise (e.g. bulk data, progressive download), depending on the implementation of the invention.

Figure 6:
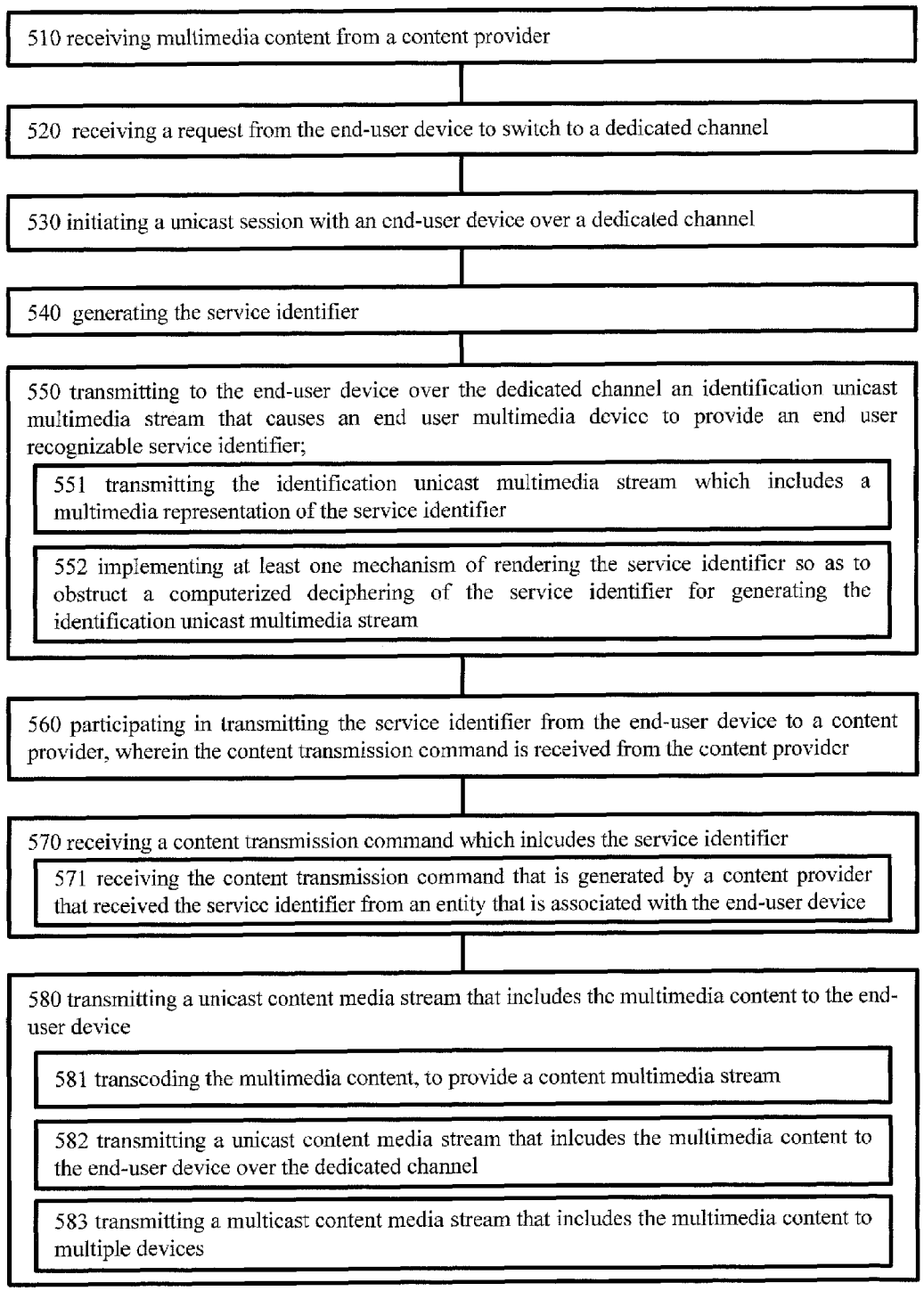
FIG. 6 illustrates a method for transmitting content, according to an embodiment of the invention.

FIG. 6 illustrates method 500 for transmitting content, according to an embodiment of the invention. It is noted that conveniently, method 500 may be implemented by system 200 discussed above, and that different embodiments of system 200 may be implemented in method 500, even if not explicitly elaborated.

According to an embodiment of the invention, method 500 starts with stage 510 of receiving multimedia content from a content provider, wherein the receiving is usually followed by storing the multimedia content in a storage unit. Nevertheless, it is noted that, according to an embodiment of the invention, method 500 may be implemented for transmitting of a multimedia content that is received as a stream, mutatis mutandis. Conveniently, multimedia content may be received from many content providers, wherein content that is provided in each act is stored separately for separate transmission to a subscriber.

The transmission of the multimedia content requires an opening of a dedicated channel with an end-user device (e.g. of a subscriber, end-user and so forth), which may be either initiated by the end-user device, or by a network unit.

It is noted that the receiving of the multimedia content from the content provided is usually not related to the other stages of method 500, and may be carried out in significantly different times in relation to other stages of method 500.

According to an embodiment of the invention, method 500 includes stage 520 of receiving a request from the end-user device to switch to a dedicated channel. It is noted that, in such a case, the initiating of stage 530 is usually responsive to the receiving of the request.

Method 500 includes stage 530 of initiating a unicast session with an end-user device over a dedicated channel. The unicast session is used for the transmission of a service identifier, which acts as an authorizing code for the transmission of the multimedia content in a later stage. It is noted that the service identifier may be either received or generated. According to an embodiment of the invention, method 500 includes stage 540 of generating the service identifier.

Method 500 continues with stage 550 of transmitting to the end-user device over the dedicated channel an identification unicast multimedia stream that causes an end user multimedia device to provide an end user recognizable service identifier. It is noted that the identification unicast multimedia stream may be either generated or received from another system.

It is noted that the transmitting of the identification unicast multimedia stream over the dedicated channel is not necessarily carried out every time the user switches to the dedicated channel—depending on the implementation of the invention. As aforementioned, the identification unicast multimedia stream may be transmitted, for example, only at a registration phase, after which the user may access the dedicated channel without receiving or using the end user recognizable service identifier.

According to an embodiment of the invention, stage 550 includes stage 551 of transmitting the identification unicast multimedia stream that includes a multimedia representation of the service identifier (e.g. visual representation, video representation, picture representation, vocal representation, and so forth).

According to an embodiment of the invention, stage 550 includes stage 552 of implementing at least one mechanism of rendering the service identifier so as to obstruct a computerized deciphering of the service identifier for generating the identification unicast multimedia stream (e.g. a captcha).

The service identifier that is provided to the end-user device is used as an authorization mechanism, is that a content provider who request the transmission of the multimedia content must acquire the service identifier from the end-user device or from the end-user itself. The providing of the service identifier to the content provider may be carried out either over the same network used for transmission of the multimedia content, or by external means.

According to an embodiment of the invention, method 500 includes stage 560 of participating in transmitting the service identifier from the end-user device to a content provider, wherein the content transmission command is received from the content provider.

It is noted that according to an embodiment of the invention, the transmission of the service identifier to the content provider requires human intervention or participation. However, according to an embodiment of the invention, the person may authorize or instruct a computing device to authorize such transmission on behalf of the person, e.g. given decision rules determined by the person.

Method 500 continues with stage 570 of receiving a content transmission command that includes the service identifier. Conveniently, stage 570 includes stage 571 of receiving the content transmission command that is generated by a content provider that received the service identifier from an entity that is associated with the end-user device As aforementioned, conveniently the receiving of the content transmission command is preceded by a transmission of the service identifier that is handled by a person Method 500 continues with stage 580 of transmitting a content multimedia stream that includes the multimedia content to the end-user device.

According to an embodiment of the invention, stage 580 includes (or is preceded by) one or more instances of stage 581 of transcoding the multimedia content, to provide a content multimedia stream.

Figure 7:
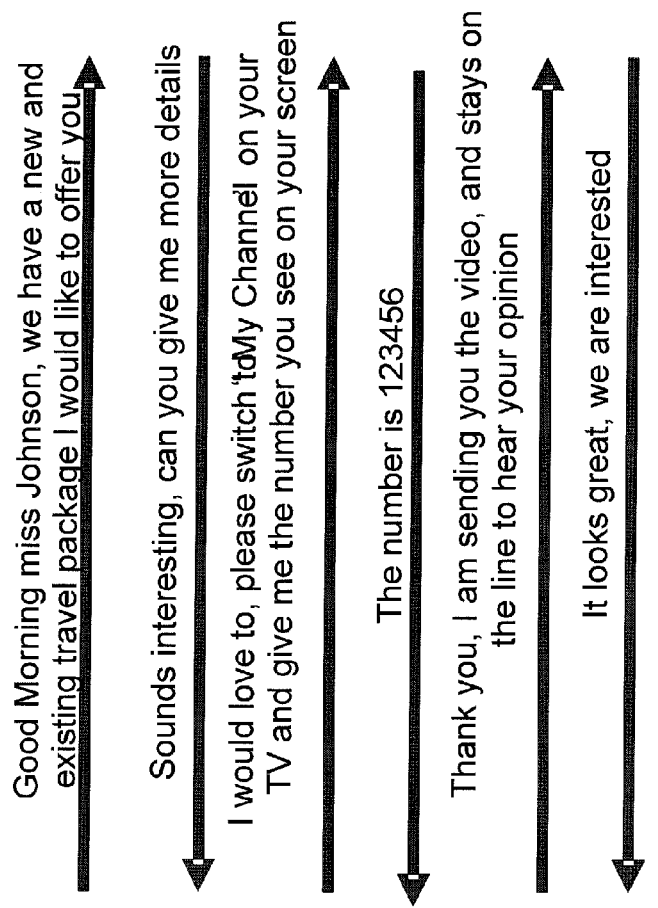
FIGS. 7 and 8 illustrate scenarios exemplifying a use of systems and methods for transmission of multimedia content, according to different embodiments of the invention.

According to an embodiment of the invention, stage 580 includes stage 582 of transmitting a unicast content media stream that includes the multimedia content to the end-user device over the dedicated channel According to an embodiment of the invention, stage 580 includes stage 583 of transmitting a multicast content media stream that includes the multimedia content to multiple devices FIG. 7 illustrates a scenario 801 exemplifying a use of such systems and methods, according to an embodiment of the invention. In this scenario the content owner 100 is a travel agent who tries to advertise a new vacation package among its existing subscribers. The travel agent uses a simple application that uploads the content he has about the new locations/packages to the storage server where it is transcoded into mpeg2 file. This can be either short clips or still images. These can be with high quality to be viewed on SD as well as HD TVs.

The travel agent makes a phone call to each of his subscribers trying to convince them to see a movie about the great new site. If the customer agrees he will switch his TV to a new channel called 'MyChannel'.

When the SDV gets a request from a user to view this channel he realizes from the STB details if it is a SD or HD STB and allocate the right bandwidth on the available QAM and instruct the STB to switch to that frequency/program number and open a session on the BEQ. The SDV doesn't put the channel details into the carousel so if another user wants to switch into 'MyChannel' he will get a new channel. (I.e. 'MyChannel' is managed by SDV server as a unicast channel)

As soon as the subscriber switches to 'MyChannel', the Switched Broadcast Session Server (SBSS) contacts the SendToTv server and ask for a unique 6 digits service ID (unique in National sense). The SBSS sends the streamer a command to start to transmit to the opened session the service ID. The streamer makes an mpeg2 file from the service ID and transmit it to the BEQ (=edge QAM). The subscriber sees this number on its TV screen.

The subscriber says to the travel agent the six digits number that he sees on his TV screen and by that approve that he is willing to see the content. (Every time the subscriber switch to 'MyChannel' he will get a new and different session ID so subscribers privacy is guaranteed—If the subscriber do not provide the number, no one can get to his TV)

The travel agent sends (using the same application he used to upload the content) a 'send content link' command with the content name and the 6 digits number to the SendToTv server.

The SendToTv server send to the appropriate SDV server a link to the content, the SDV server sends it to the streamer, the streamer download the content and while downloading it he starts to transmit the content towards the BEQ so the subscriber can immediately see it on his screen. From now on, every content that will be sent to the said "6 digit" number will be viewed on the subscriber TV until the subscriber is switching to a different channel.

Figure 8:
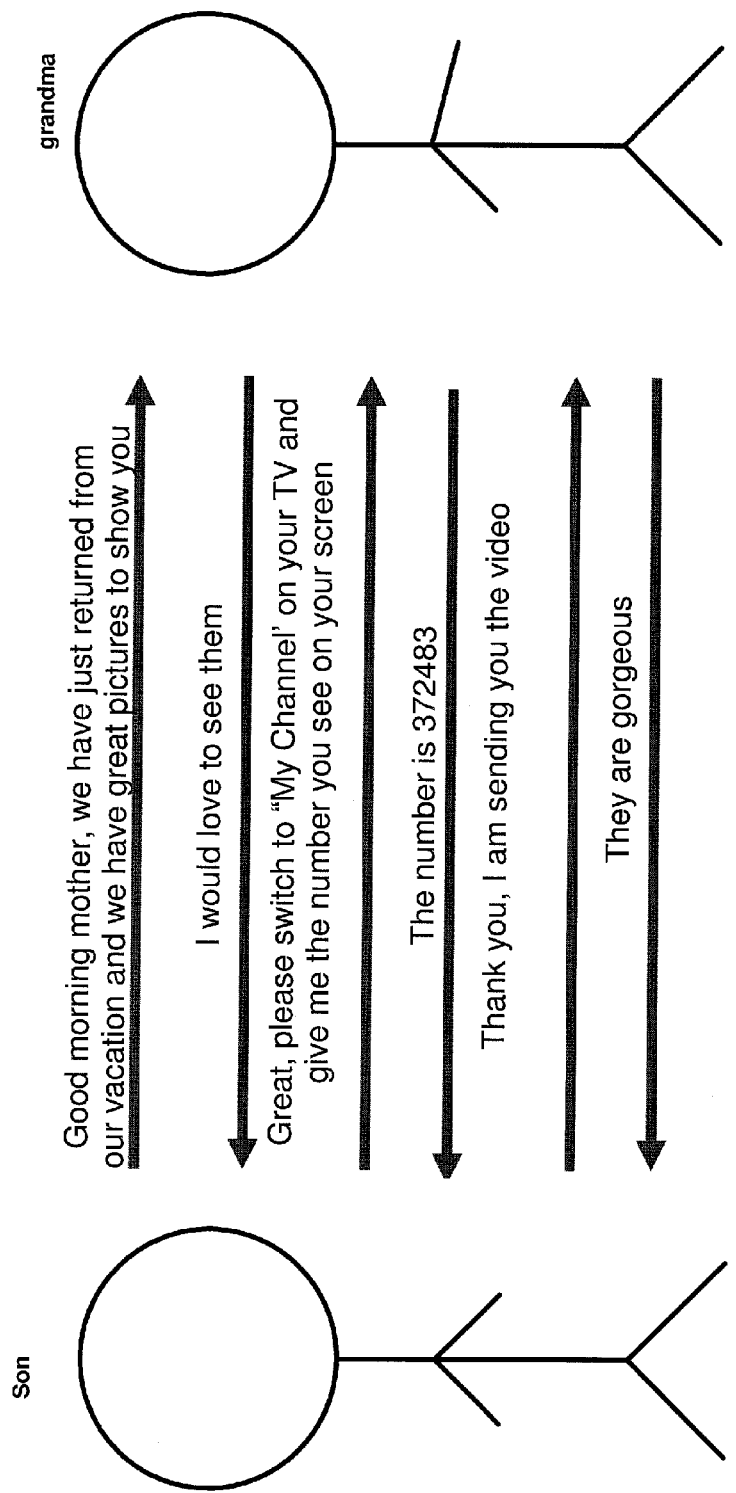

FIG. 8 illustrates a scenario 802 exemplifying a use of such systems and methods, according to an embodiment of the invention.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A system for transmitting multimedia content, the system comprises:
   a storage server operable to receive multimedia content from a first end user device associated with a first end user, the multimedia content being intended for distribution to one or more other end users;
   a switched broadcast server comprising at least one processor and memory and configured to initiate a unicast session with a second end-user device associated with the one or more other end users over a selected dedicated channel of a plurality of dedicated channels, the switched broadcast server being further operable to generate a first unique service identifier upon initiation of the unicast session with the second end-user device, and to transmit to the second end-user device over the selected dedicated channel the first unique service identifier for the second end user device that identifies the second end user device and the unicast session, the user of the second end-user device being able to transmit the first unique service identifier to the first end user device to enable the first end user device to instruct the switched broadcast server to forward the stored multimedia content to the second end user device; and
   an interface configured to receive a content transmission command from the first end user device, the content transmission command comprising the first unique service identifier for the second end user device, and is provided by the first end user via the first end user device to enable the switched broadcast server to retrieve the multimedia content and share the multimedia content over the unicast session established by the second end user device in an ad hoc manner;
   wherein the system is further configured to transmit a content multimedia stream that comprises the stored multimedia content from the first end user device to the second end-user device in response to the content transmission command.

2. The system of claim 1, wherein the switched broadcast server is further configured to initiate the unicast session in response to receiving a request from the second end-user device to switch to a dedicated channel, whereby the system is configured to transmit the content multimedia stream responsive to both the content transmission command and receiving the request to switch to the dedicated channel.

3. The system of claim 1, wherein the switched broadcast server is configured to transmit the identification unicast multimedia stream that comprises a visual representation of the first unique service identifier.

4. The system of claim 1, wherein the first unique service identifier is provided by the second end user over a phone line.

5. The system of claim 1, wherein the interface is further for receiving the content transmission command that is generated by the first end user that received the first unique service identifier from an entity that is associated with the second end-user device.

6. The system of claim 1, further configured to participate in transmitting the first unique service identifier from the second end-user device to a content provider, wherein the content transmission command is received from the first end user.

7. The system of claim 1, further configured to transmit a unicast content media stream that comprises the multimedia content to one or more other end-user devices over the dedicated channel.

8. The system of claim 1, further configured to transmit a multicast content media stream that comprises the multimedia content to multiple devices.

9. The system of claim 1, further comprising a streamer module that is configured to download the multimedia content from a storage entity, to participate in transmission of multimedia content to the one or more other end-user devices, and to generate the identification unicast multimedia stream that includes the first unique service identifier.

10. The system of claim 1, wherein the first unique service identifier is an alphanumerical code that is displayed on a display unit of the second end user device.

11. The system of claim 1, wherein the first unique service identifier is an audio representation of the first unique service identifier.

12. A method for transmitting multimedia content, the method comprises:
receiving multimedia content from a first end user device of a multiple service operator network;
storing the multimedia content received from the first end user device at a storage server;
receiving a request from a second end user device to initiate a unicast session with a switch broadcast server based on the second end user device tuning to a selected dedicated channel from a plurality of dedicated channels;
initiating a unicast session with a second end-user set top device associated with a second end user over a dedicated channel of the multiple service operator network;
after initiating the unicast session, generating a unique target service identifier, the unique target service identifier being operable to uniquely identify the unicast session established by the second end user device;
transmitting to the second end-user set top device over the dedicated channel content stream comprising the unique target service identifier associated with the unicast session and the second end user set top device, the transmitting causing he second end user device to display to the second end user the unique target service identifier associated with the unicast session and the second end user set top device, wherein the second end user can provide the unique target service identifier to the first end user device, thereby enabling the first end user device to instruct the switched broadcast server to retrieve the multimedia content from storage and provide the multimedia content over the unicast session previously established by the second end user device;
receiving a content transmission command from the first end user device that comprises the unique target service identifier that uniquely identifies the unicast session and the second end user set top device; and
in response to the content transmission command, transmitting a content multimedia stream that comprises the multimedia content provided by the first end user device, the transmitting being performed by the storage server and switched broadcast server to the second end-user set top device, thereby providing an ad-hoc method for sharing the multimedia content between users with no prior established connection.

13. The method of claim 12, wherein the initiating is preceded by receiving a request from the second end-user set top device to switch to a dedicated channel, wherein the initiating is responsive to the receiving of the request.

14. The method of claim 12, wherein the transmitting of the content stream comprises transmitting the content stream comprising a visual representation of the unique target service identifier associated with the second end user set top device.

15. The method of claim 12, wherein the unique target service identifier is provided by the second end user to the first end user over a phone line provided by the multiple service operator network.

16. The method of claim 12, wherein the receiving of the content transmission command comprises receiving the content transmission command including the unique target service identifier from the first end-user device.

17. The method of claim 12, further comprising participating in transmitting the unique target service identifier from the first end-user device to a content provider, wherein the content transmission command is received from the first end user device.

18. The method of claim 12, wherein the transmitting of the content multimedia stream comprises transmitting a unicast content media stream that comprises the multimedia content to the second end-user set top device over the dedicated channel.

19. The method of claim 12, wherein the transmitting of the content multimedia stream comprises transmitting a multicast content media stream that comprises the multimedia content to multiple set top devices for whom respective unique service identifiers have been received from the first end user device.

20. The method of claim 12, wherein the receiving of the content transmission command is preceded by a transmission of the unique service identifier that is handled by a person.

21. The method according to claim 12, wherein the unique service identifier is an audio representation of the service identifier.

22. The method according to claim 12, wherein the unique service identifier is an alphanumerical code that is displayed on a display unit of the second end user device.

23. A server, the server comprises:
at least one storage server storing multimedia content received from a first end user device associated with a multiple service operator network;
a hardware processor configured to generate a unique service identifier in response to a service request and to transmit the unique service identifier to a second end user device, whereby the second end user device is operable to provide the unique service identifier to the first end user device to enable the first end user device to provide the unique service identifier to the processor to facilitate providing the multimedia content from the storage server to the second end user device, thereby providing an ad hoc system for sharing the multimedia content between users with no prior established connection;

an input interface for receiving from the first end user device a content transmission command that comprises the unique service identifier; and an output interface for selectively transmitting the multimedia content received from the first end user device from the storage server to the second end user device associated with a second user of the multiple service operator network, wherein the transmitting is responsive to the reception from the first end user device the content transmission command comprising the unique service identifier associated with the second end user device.

* * * * *